(12) United States Patent
Hansen et al.

(10) Patent No.: US 12,730,083 B2
(45) Date of Patent: Sep. 8, 2026

(54) BEND NAVIGATING INSERTION TOOL FOR PIPES

(71) Applicant: Electro Scan, Inc., Sacramento, CA (US)

(72) Inventors: Charles A. Hansen, Carmichael, CA (US); Sean Blottie, Fair Oaks, CA (US); Matthew Campos, Fair Oaks, CA (US); Janine Mullinix, El Dorado Hills, CA (US); Sonja Hansen, Carmichael, CA (US); Bianca Hansen, Carmichael, CA (US); Morgan Hansen, Carmichael, CA (US); Valeri Zaharie, Post Falls, ID (US); Bansari Doshi, San Jose, CA (US); Mike App, Baldwinsville, NY (US)

(73) Assignee: Electro Scan, Inc., Sacramento, CA (US)

( * ) Notice: Subject to any disclaimer, the term of this patent is extended or adjusted under 35 U.S.C. 154(b) by 52 days.

(21) Appl. No.: 19/011,172

(22) Filed: Jan. 6, 2025

(65) Prior Publication Data

US 2025/0137957 A1 May 1, 2025

Related U.S. Application Data

(60) Continuation of application No. 18/753,845, filed on Jun. 25, 2024, now Pat. No. 12,385,865, which is a division of application No. 17/895,239, filed on Aug. 25, 2022, now Pat. No. 12,105,040.

(51) Int. Cl.
*G01N 27/04* (2006.01)
*G01N 27/22* (2006.01)

(52) U.S. Cl.
CPC ......... *G01N 27/041* (2013.01); *G01N 27/226* (2013.01)

(58) Field of Classification Search
CPC .. G01N 27/041; G01N 27/226; G01N 27/221; G01N 27/228
See application file for complete search history.

(56) References Cited

U.S. PATENT DOCUMENTS 6,301,954 B1 * 10/2001 Schuberth .............. G01M 3/40 73/40
2013/0199272 A1 * 8/2013 Khalifa ................ G01M 3/005 73/40.5 A (Continued)

*Primary Examiner* — Alvaro E Fortich
(74) *Attorney, Agent, or Firm* — Heisler & Associates

(57) ABSTRACT

A probe provides one end of an electrically conductive path with a ground stake defining a second end. The probe is supported on a tip of a cable rotatably supported by a snake, with the snake including a conductor routed toward the ground stake. A voltage source and a current sensor are located upon said electrically conductive path. The probe is fed by action of the snake along an underground pipe to be scanned. The current sensor senses current flow between the probe within the underground pipe and the ground stake. Analysis of the current flowing in this electric circuit allows for determining if underground pipe material includes lead, based at least partially on electrical conductivity of pipe segments through which the probe passes. A tool is provided to assist in navigating a sharp bend near where the probe enters the pipeline.

20 Claims, 6 Drawing Sheets

(56) References Cited

U.S. PATENT DOCUMENTS

| | | | | |
|---|---|---|---|---|
| 2013/0218485 | A1* | 8/2013 | Hansen | G01N 27/60<br>702/38 |
| 2017/0045416 | A1* | 2/2017 | Hansen | G01M 3/18 |
| 2018/0080847 | A1* | 3/2018 | Hansen | G01M 5/0025 |

* cited by examiner 8
7
74
28
72
70
10
28
60
22
24
23
28
20
2

26
25
D
6
25
E 27
4
25
35
32
A
36
38
36
230
25
330
25
232
332
38
30
36
334
234
38
36
236
34
B

130

| | Electrical Resistivity at 293 K, μΩcm | Thermal Conductivity $Wm^{-1}k^{-1}$ | Relative Electrical Conductivity (Copper = 100) | Relative Thermal Conductivity (Copper = 100) |
|---|---|---|---|---|
| Silver | 1.63 | 419 | 104 | 106 |
| Copper | 1.694 | 397 | 100 | 100 |
| Gold | 2.2 | 316 | 77 | 80 |
| Aluminum | 2.67 | 238 | 63 | 60 |
| Beryllium | 3.3 | 194 | 51 | 49 |
| Magnesium | 4.2 | 155 | 40 | 39 |
| Tungsten | 5.4 | 174 | 31 | 44 |
| Zinc | 5.96 | 120 | 28 | 30 |
| Nickel | 6.9 | 89 | 24 | 22 |
| Iron | 10.1 | 78 | 17 | 20 |
| Platinum | 10.58 | 73 | 16 | 18 |
| Tin | 12.6 | 73 | 13 | 18 |
| Lead | 20.6 | 35 | 8.2 | 8.8 |
| Titanium | 54 | 22 | 3.1 | 5.5 |
| Bismuth | 117 | 9 | 1.4 | 2.2 |

122
132
140
160
130
150
152
120
124
136
25
234
230
236
146
144
F
142
A
134
35

122
130
146
144
120
160
140
150
124
142
90
94
96
98
99
92
F 90
146
120
144
160
94
130
140
150
92
142
98
99

90
120
140
38
160
30
94
130
96
25
35
98
92
F
A
236
99

BEND NAVIGATING INSERTION TOOL FOR PIPES

CROSS-REFERENCE TO RELATED APPLICATIONS

This application is a continuation-in-part of U.S. patent application Ser. No. 18/753,845, filed on Jun. 25, 2024, which is a divisional of U.S. patent application Ser. No. 17/895,239, filed on Aug. 25, 2022.

FIELD OF THE INVENTION

The following invention relates to systems for detecting lead and potentially other materials from which underground pipes (or joints) are formed. More specifically, this invention relates to lead detection systems for underground pipes which sense electrical characteristics of the pipes and connectors as at least part of pipe material detection, as well as apparatuses for assisting in insertion of flexible probes such as lead detecting probes into pipelines.

BACKGROUND OF THE INVENTION

Underground pipes and connectors can be formed of a variety of different materials. Factors which go into pipe material selection include the fluids to be carried by the pipe, whether the fluids are carried under elevated pressure or not, and availability of materials near where the pipes are to be located, among other factors. Historically, materials used in forming underground pipes have differed, as technology and availability of different materials have advanced. For instance, modern supply pipes for residential housing are often formed of copper or plastic. In some instances other materials such as steel or cement or concrete are used.

In the more distant past, it has been known in at least some instances to utilize lead pipe to supply water. While lead has been known for a long period of time to be toxic, some water service lines have at least segments thereof which date back to a time before when lead was known to be toxic, or when sensitivity to use of lead in water lines was sufficiently low that some lead was still being used for pipe segments. While such old water lines typically have been replaced over time, at least some segments of underground water lines and other pipes are still in use which date back to when lead might have been used. When adjacent pipe segments were replaced, installers might have been ignorant or insensitive to the type of pipe to which they were connecting new pipe segments, missing an opportunity to identify and replace segments of lead pipe. It has also been confirmed that lead pipes that were either previously replaced or located upstream from a home that contained galvanized piping, may have lead particulates that permanently attach to non-lead pipes. Hence, an ongoing risk exists that lead pipe segments might still be in use for water lines and other fluid carrying lines.

Furthermore, pipe segments are joined together in a variety of different ways, with such pipe joining technologies having adapted to available technologies and materials over time. Some pipe joining techniques involve soldering, or the use of couplings which, during at least some eras, included lead as least as a component of such pipe joining technology. Hence, a potential for lead to find its way into water carried within the water line is presented by such legacy pipe joining technology.

Accordingly, a need exists to evaluate existing old water lines and other underground pipes to determine if any segments of the pipes or connectors are formed of lead or contain lead therein or at junctions thereof. While the pipes can certainly be dug up and the pipe directly tested, such a process is often quite difficult and expensive. One can envision a typical East Coast city which has perhaps half of its water lines over 100 years old. While certainly most of those water lines are not made of lead, to ensure that none of those water lines contain lead therein, the entire city's water supply infrastructure would need to be dug up and replaced. While such a process might be economical if a large percentage of the existing water lines were formed of lead, the economic cost would be the same even if no lead pipe segments at all were uncovered.

Testing an end of a water line, such as when a new water main is installed, only accounts for the material forming the water line where it joins to the water main. If the water line was previously repaired and only a portion thereof replaced, perhaps before quality records were kept, the potential exists that a portion of the water line leading into a residence from the water main might still contain at least one lead pipe segment therein. It is also customary when cities upgrade to new water meters, that might adopt the latest wireless meter reading technology, to include newer plastic or copper piping on either side of the meter, without replacing the remaining pipe that connects either to the water main or the home.

While it is possible to line interiors of pipes, such technologies can be difficult to perform on small diameter pipes, and have negative attributes including decreasing available flow through such pipes and risk that such interior coating is not free from gaps in the coating. Furthermore, pipe lining can be most economical when focusing on pipes which are known to be made of lead or contain lead.

One problem with inserting probes into systems of pipes is that these pipes often include sharp bends, such as 90° bends therein. When a probe is advanced through such a pipeline by pushing a proximal end of the probe, the terminal end of the probe can hit a wall ahead of the bend, and further pushing of the probe does not cause the probe to turn and pass through the bend. This problem is particularly acute when a corner chamber is located ahead of the bend, which includes a shoulder surrounding a neck at the beginning of the bend.

Such a corner chamber, shoulder and neck are commonly present at pipeline fittings adjacent to a water meter in a water pipeline, such as that providing water to residential customers. Access to the pipeline can be conveniently gained by removing the water meter, and then utilizing the pipeline fittings adjacent to the water meter location for pipeline access. However, the corner chamber, shoulder and neck of the pipeline fittings resist access by the terminal end of the probe. Rather, the terminal end of the probe hits a wall of the corner chamber, and because the bend is a 90° bend and because of the existence of the shoulder and the small diameter of the neck passing through the bend, the terminal end of the probe cannot be advanced beyond this corner chamber.

Accordingly, a need exists for a tool and/or method which can assist an elongate flexible object, such as a pipeline probe, to pass around a bend in a pipeline. Such a tool can beneficially be configured with particular common bend geometries taken into consideration. The tool thus facilitates passing of the terminal end of the flexible elongate object past such a bend, and further navigation through the pipeline. The probe can then perform a variety of different intended functions such as lead detection, while located within otherwise difficult to access portions of a pipeline downstream of a sharp bend, such as a 90° bend.

SUMMARY OF THE INVENTION

With this invention, a system and method are provided for detection of lead in underground pipes, utilizing an electric scanning methodology. First, a circuit is created which includes a ground stake penetrating into the ground above or otherwise near where a water line to be scanned is located. A conductive pathway is provided between this ground stake and a probe. The probe is passed within an interior of the pipe to be scanned. The conductive pathway has a voltage source placed thereon and also a current sensor. The voltage source causes a potential difference between the probe and the ground stake. This potential difference causes at least a small amount of current to pass between the probe and the ground stake, which current can be sensed by the current sensor. This circuit between the probe and the ground stake includes fluids within the pipe, the wall of the pipe, and soil between the pipe into the ground stake. The current that is sensed is thus at least partially dependent on electrical conductivity of the pipe wall. This electrical conductivity of the pipe wall can be determined by the system of this invention and then evaluated to determine whether this conductivity is indicative of the pipe wall being formed of lead.

To conveniently implement the system of this invention, it is desired in some embodiments to have the conductive pathway include a spool thereon which allows for a length of the conductive pathway to be adjusted in length to match the geometry of the field location where the underground pipe is to be scanned. The spool is of a type which maintains an electrical connection between a first conductor on one side of the spool and a second conductor on a second side of the spool. The second conductor can attach to the ground stake. The first conductor can lead toward the probe.

To further conveniently implement the system of this invention, it is desired in some embodiments to have the conductive pathway include a snake type device. This snake device includes a cable supported upon a cable spool and with an electric motor configured to rotate the cable spool. An outlet collar allows for cable to be conveniently played off of and back onto the cable spool through rotation of the spool caused by the electric motor within the housing of the snake device. The probe is attached to an end of the cable. The first conductor forming a portion of the conductive pathway maintains electrical connection to the cable. To gain access to an interior of an underground pipe to be scanned, typically some access portal such as an extension coupled into a curb stop (or valve or meter or other access point) in a service line which includes the underground pipe to be scanned, is accessed with the probe supported by the cable of the snake.

The snake or some other system monitors a distance that the probe is fed down into the service line. This distance (or time as an alternative) is correlated with current sensor data collected by the current sensor. In this way, a graph of current values versus distance along the underground pipe being evaluated, can be gathered. The data can then be analyzed to determine if it is indicative of the presence of lead within any segments of the underground pipe.

As one example, this analysis can include a step where lateral distance from the location within the underground pipe being scanned that is adjacent to the probe, and the ground stake can be at least estimated for various points along the pipe being scanned. Because the amount of soil which lies along the conductive pathway will vary depending on the position of the probe and the distance from the location of the probe to the ground stake, it is beneficial, in at least one embodiment, to normalize the current data provided by the current sensor to factor out this soil distance factor. For instance, if 80% of a voltage drop occurs within the soil when the pipe is at its closest to the ground stake, and when 90% of the voltage drop occurs within the soil when the pipe is at its greatest distance from the ground stake, 20% of the sensed current can be removed from the sensed current values which correlate with the portion of the pipe closest to the ground stake and 10% of the sensed current can be removed from the sensed current values which correlate with the portion of the pipe most distant from the ground stake, and since current values in between these extremes can be proportionally adjusted.

After such normalization procedure, the remaining current data is that portion of the current data which corresponds with the voltage drop which occurs due to the resistivity/conductivity of the material from which the underground pipe wall is formed. The voltage drop associated with water within the pipe being scanned is quite low and generally constant, and so typically does not require normalization.

The normalized current versus distance data can then be evaluated to look for anomalies and other characteristics which might be indicative of lead pipe segments. In one embodiment, one data analysis technique is to look for abrupt transitions in sensed current values. Such abrupt transitions which persist over some distance (as opposed to short distance spikes which typically represent areas of greater pipe thickness such as joints) generally represent a change in material. Often at least one material on one side of this transition is a known material. For instance, if the underground pipe is accessed from near a water main, one might directly sample or have high quality records that the access point is formed of copper. If the current values start high (indicative of copper), and then change abruptly at a transition to a lower value, an amount of this transition to the lower value can be evaluated. If it drops to an exceptionally low value, it might be indicative of a transition to plastic or other polymeric hydrocarbon material with a very low conductivity and high resistively. If it drops to an intermediate lower value, it might be indicative of lead. Conversely, if a known pipe segment that is first scanned is known to be plastic, and current values transition from a lower level to a higher level at a transition, but the transition is not a large jump in since current, it might be indicative of lead. While if a large jump is experienced, it might be indicative of a transition to copper.

In other instances, multiple segments of pipe might be formed with known material, such as a portion being formed of copper and a portion being formed of plastic. If portions of the normalized current versus distance data exhibit an intermediate sensed current reading, this can be indicative of a lead pipe segment.

Once lead is suspected as perhaps being present, locations of transitions can be mapped and holes can be dug to directly take samples of pipes in areas where lead is suspected, to confirm the presence or absence of lead. As another technique, the probe itself is preferably formed of a series of alternating tightly wound and loosely wound helical wire to both facilitate being advanced about sharp bends in small diameter pipe, and also to facilitate aggressive and abrasive engagement within interior walls of the pipe. When the probe is retracted, testing procedures, such as utilizing a lead testing kit can be conducted on the probe tip to determine if any lead was encountered by the probe tip. Lead is a soft metal that is easily scratched so that such sampling can be effective. Probe tips can either be sanitizable to remove lead from the probe after it has been sensed, or probe tips can be replaced with fresh probe tips to provide a fresh probe tip for further utilization of the system of this invention, especially after a positive test for lead.

Current sensor data is preferably transmitted, such as wirelessly, to a separate device having appropriate software for optimal normalization of the data and analysis of the data. In one embodiment, a Bluetooth connection is maintained with a smart phone or tablet computing device associated with the system of this invention. In one embodiment, the voltage source and the current sensor are both integrated into the housing of the snake and a rechargeable battery is removably attachable to the snake which supplies electric power to the electric motor of the snake and also provides electric power to the voltage source, as well as the transmitter. The housing of the snake can optionally also support a display or other read outs for direct use in the field for quick review of data. Most preferably, the data collected by the system is archived in a database which correlates the data to a geographic location, which allows for municipal operators or others to efficiently maintain an archive of data for various different locations within their jurisdiction which have been recently scanned.

An insertion tool is also provided according to this invention. The tool is particularly configured to assist the terminal end of the probe in passing through bends in the pipeline, and particularly a first sharp bend (for example, a 90° bend) that is closer to an entrance into the pipeline than a length of the insertion tool.

The insertion tool includes a proximal end opposite a distal end, and with a hollow core extending between an entry of the tool and a port out of the tool. In one embodiment, the tool is configured as a rod with a tip at the distal end thereof. The port is between the tip and the proximal end and located in a sidewall of the hollow core. The entry is at or near the proximal end.

A curve or other lateral deflection surface is provided within the hollow core and adjacent to the port. When a terminal end of a probe (or other flexible elongate item/object) is advanced through the hollow core of the tool, this terminal end comes into contact with the lateral deflection surface and is caused to curve away from a centerline of the tool and out of the port, while extending in a direction lateral away from the centerline of the tool.

The port of the tool is aligned facing an access into the bend in the pipeline. Thus, when the terminal end of the elongate object, such as a probe, is passed through the hollow core, its curving path against the curve and out of the port, feeds the terminal end into the bend, and allows the terminal end of the probe to pass through and traverse the bend.

The lateral deflection surface can in an alternative embodiment be a facet, such as a mostly or entirely planar facet, or can be more curving in nature. In one embodiment, the curve has a decreasing radius of curvature as the curve extends from the entry toward the port. The port is spaced away from a tip of the rod or other tool by a distance which can be sized to be about the same as a size of a shoulder between a corner chamber preceding a bend and a neck and other portions of the bend downstream of the shoulder. In this way, the port is precisely aligned adjacent to the neck of the bend when the tip of the rod or other tool is abutting a wall of a corner chamber preceding the shoulder and neck of the bend. Such sizing allows for optimal placement of the port for feeding of the terminal end of the flexible elongate object into the neck of the bend.

OBJECTS OF THE INVENTION

Accordingly, a primary object of the present invention is to provide a system for detecting whether a segment of underground pipe contains lead or not.

Another object of the present invention is to provide a method for scanning underground pipes to determine if they contain lead.

Another object of the present invention is to use electrical conductivity of underground pipes to determine if they are formed at least partially of lead.

Another object of the present invention is to gather underground pipe electrical conductivity correlated data and to evaluate the data to determine if any segments of the pipe are formed of lead.

Another object of the present invention is to provide a system and method which can inform a user as to which portions of underground pipes warrant further investigation as to whether or not they contain lead.

Another object of the present invention is to provide a system and method which can be readily conducted in the field, whether a pipe is pressurized or non-pressurized, without requiring digging or damage to existing pipes, and determine if underground pipes are formed of lead or contain lead.

Another object of the present invention is to provide a system which is easy to set up and operate, and provides robust repeatable data as to conductivity of materials forming underground pipes, which can be correlated with material from which the pipe is made, including lead.

Another object of the present invention is to provide a system which includes a probe which can be advanced along an interior of a underground pipe and which can navigate through sharp corners and navigate through small pipe diameters, and which can work with other parts of the system to measure conductivity of walls of the underground pipe, at least indirectly.

Another option to the present invention is to provide a system which includes a probe which can be advanced along an interior of an underground pipe and which can work with other parts of a system to electrically scan the underground pipe and which can also gather a sample of the pipe by scraping interior walls of the pipe, which scrapings can be later tested for presence of lead therein.

Another object of the present invention is to provide an insertion tool which assists in passing a terminal end of a probe into a pipeline, and especially assisting in navigating a first sharp bend near an entrance into the pipeline.

Another object of the present invention is to provide a method for routing a terminal end of a flexible elongate object past a bend in a pipeline.

Another object of the present invention is to provide a method and apparatus for navigating a pipeline probe past a water meter interface, including a 90° bend therein downstream of a corner chamber, and with a shoulder surrounding a neck of the bend beyond the corner chamber.

Other further objects of the present invention will become apparent from a careful reading of the included drawing figures, the claims and detailed description of the invention.

DESCRIPTION OF THE PREFERRED EMBODIMENT

Figure 1:
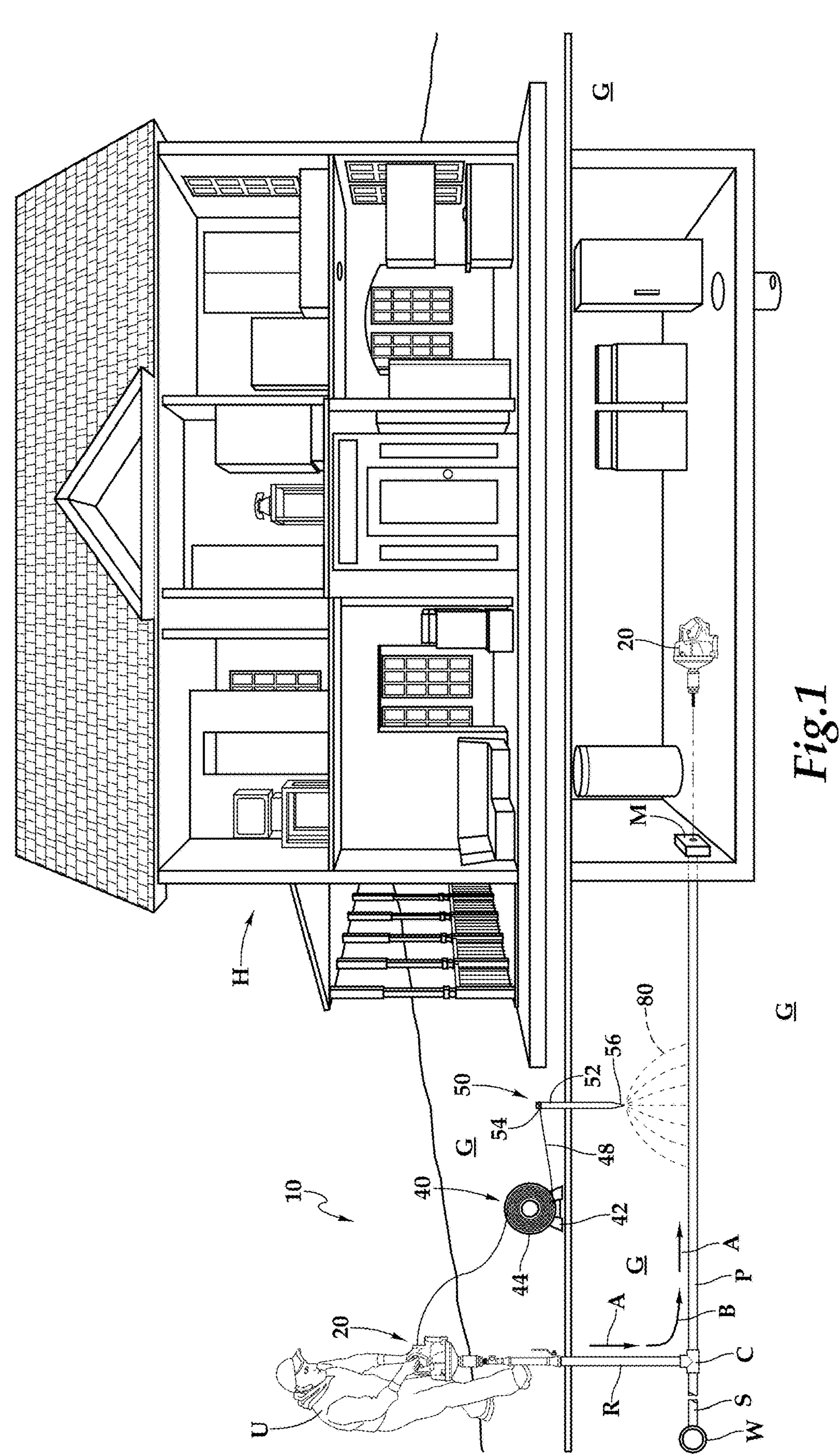
FIG. 1 is a front elevation view of a segment of pipe servicing a house, and with the system of this invention in use for scanning a service line leading to the house for determination of whether lead is associated with the pipes providing the service line.

Referring to the drawings, wherein like reference numerals represent like parts throughout the various drawing figures, reference numeral 10 is directed to a system for detection of lead in underground pipes (FIG. 1). The system 10 creates an electric circuit which includes a wall of the underground pipe P as at least a portion thereof, and then evaluates the electrical properties of the pipe P wall to make a determination as to what material the pipe P wall is formed of, and to inform further investigations to confirm the presence or absence of lead.

Figures 2, 3, 3A, 3B:
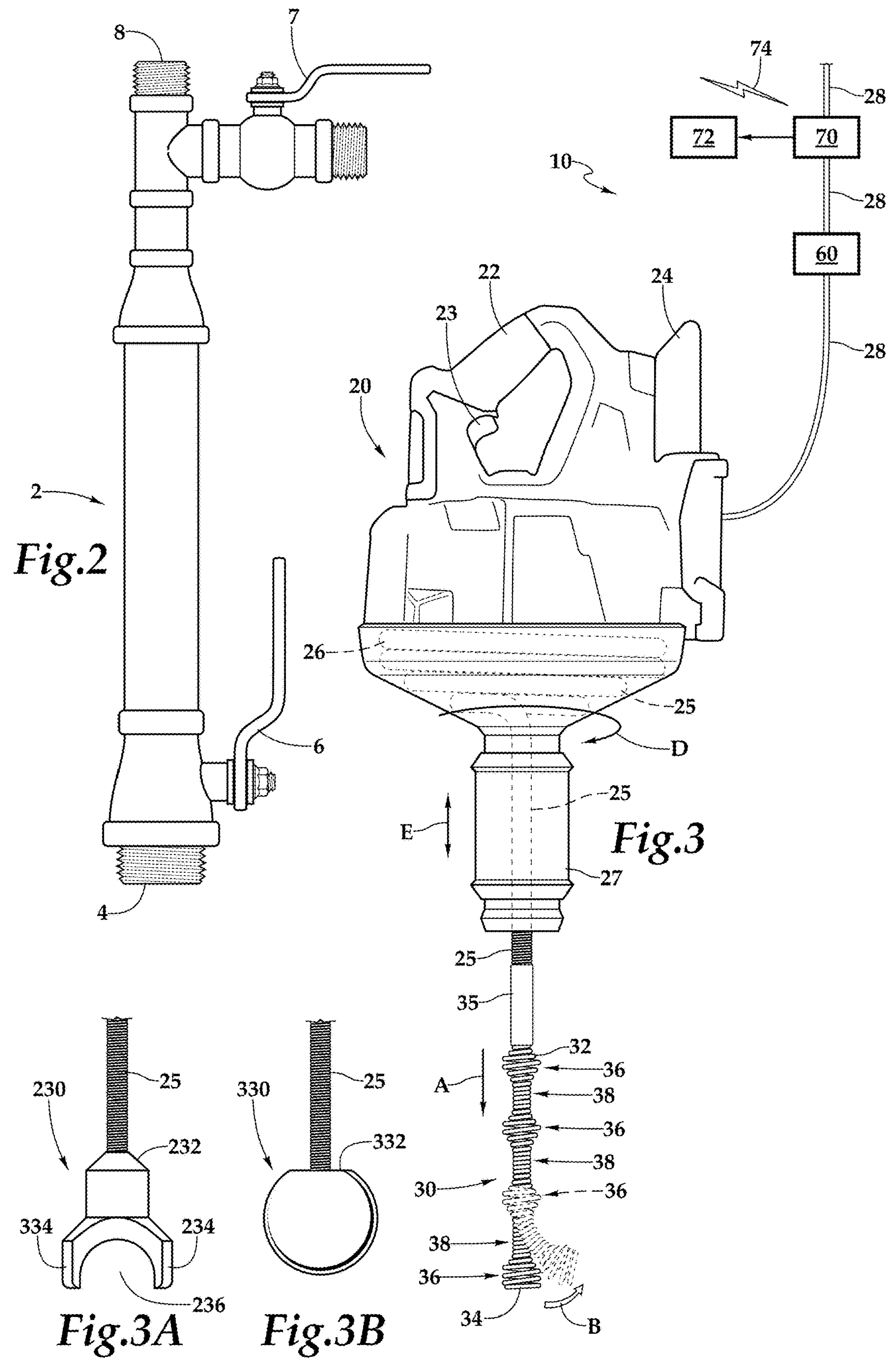
FIG. 2 is a front elevation view of an extension used with one embodiment of this system to gain access into the service line.
FIG. 3 is a front elevation view of a snake supporting a probe for passing into the service line for scanning of the service line underground pipe according to this invention, and also showing other portions of the overall lead detection system.
FIG. 3A is a detail of an alternative tip for a probe such as that shown in FIG. 3.
FIG. 3B is a detail of a further alternative tip for a probe such as that shown in FIGS. 3 and 3A.

In essence, and with particular reference to FIGS. 1-3, basic details of the system 10 are described, according to an example embodiment. A snake 20 provides an optional portion of an electrically conductive path in this embodiment. The snake supports a probe 30 in a movable manner along an interior of a pipe P to be scanned. A spool 40 provides an optional additional portion of an electrically conductive path which leads from the snake 20 to a stake 50 which is removably attachable into ground through which the underground pipe P passes. Soil 80 within ground G between the pipe P and the ground stake 50 provides a further portion of the electric circuit. A voltage source 60 and current sensor 70 are located along the conductive path at any of a variety of locations therealong. In one embodiment, they are integrated into a housing of the snake 20. The voltage source 60 causes current to flow along the conductive path. The current sensor 70 senses an amount of current flowing along the conductive path as well as through the ground G soil 80 and pipe P wall. Data from the current sensor 70 is correlated with a position of the probe 30 along the pipe P. Analysis of this data allows for determinations to be made as to the material from which the pipe P is formed.

More specifically, and with particular reference to FIG. 2, details of an extension 2 (also called an insertion tube or pipe) are described, which allows for access into an underground pipe P to be scanned according to one embodiment of this invention. While access into a pipe P to be scanned might occur in a variety of different ways, typically underground pipes P already have access points adjacent thereto which can be utilized with the system 10 of this invention. In one embodiment, service lines S are underground pipes P for carrying water to a house H from a water main W are accessed through a curb stop C between the water main W and along the service line S. This curb stop C typically has some form of access port at a surface of the ground G. The extension 2 can be coupled to an existing riser R extending up from the curb stop C to provide for convenient access. In other embodiments, the riser R is sufficiently accessible that the extension 2 is not needed. Other access ports, such as sewer clean out ports, could alternatively be utilized for other types of fluid lines, either pressurized or unpressurized.

The extension 2 depicted herein (FIG. 2) is elongate in form and includes a coupling 4 at the lower end which provides one form of access point which can thread or otherwise attach into a corresponding junction on the riser R (FIG. 1). In this particular embodiment, the extension 2 includes a lower valve 6 which can allow for selective opening and closing of flow through the extension 2. An upper valve 7 can also be optionally provided, such as to allow water flow laterally or to be used for filling of the water line if it is partly empty. An access port 8 provides one form of entry which can be provided on an upper end of the extension 2. This access port 8 is utilized to feed the probe 30 down into the pipe P for scanning thereof, such as utilizing the snake 20 by a user U adjacent to the extension 2. In one embodiment, the extension 2 is used while the pipe P is pressurized. Some seal or defector can be provided inside the extension to allow the probe 30 to pass in and minimize water flow rate and velocity out of the port 8. Alternatively, water supply can be shut off before scanning according to this invention. As an option, the probe 30 can pass from inside of the house H, such as at a meter M or other access point, and then into the pipe P to be scanned (with or without the extension 2 being needed). In such a reverse setup (FIG. 1), the cable 25 would typically be routed through the house H, through a door or other access from the house H, and then to the spool 40 (located inside or outside) and onto the ground stake 50 located outside.

With a particular reference to FIGS. 1 and 3, details of the snake 20 are described, according to one example embodiment. While the probe 30 could merely be hand fed into the pipe P, this probe 30 advancing procedure (along arrow A of FIGS. 1 and 3) is simplified through utilization of the snake 20. The snake 20 includes a spool 26 with cable 25 supported thereon. The cable 25 extends out of the snake 20 through a collar 27 leading to a connector 35 where the cable 25 can be coupled to the probe 30.

In this embodiment, the snake 20 is contained within a housing which includes a grip 22 to allow a user U to conveniently hold the snake 20. A trigger 23 is adjacent to the grip 22. When the trigger 23 is actuated, an electric motor within the housing is caused to rotate, which in turn causes the cable spool 26 to rotate. The collar 27 can be cycled linearly away from other portions of the snake 20 and back toward other portions of the snake 20 (along arrow E of FIG. 3). This causes an amount of cable 25 to be played off of the cable spool 26 and out of the collar 27. Correspondingly, the probe 30 advances (along arrow A) within the pipe P (FIG. 1). If the pipe P has a sharp bend therein, the probe P is configured so that it can be angled to follow the pipe P (by pivoting along arrow B of FIG. 3). Rotation of the spool 26 within the housing of the snake 20 is shown along arrow D of FIG. 3. The snake 20 can include a reversing button which allows for the electric motor to be reversed and for retraction of the cable 25 back onto the spool 26 within the housing of the snake 20.

The cable 25 can include an electrically conductive pathway (such as a conductive wire surrounded by insulation carried within an interior of the cable 25). As an alternative, metal forming the cable 25 can itself form the electrical pathway, with or without insulation on an exterior of the cable 25. The spool 26 is configured so that it can maintain electrical connection between a first conductor 28 leading away from the snake 20 on an end of the cable 25 opposite the probe 30. This first conductor 28 leads away from the snake 20 and toward the ground stake 50 (typically through the spool 40).

The snake 20 preferably is powered by a battery 24. In one embodiment, this battery 24 is a rechargeable battery which can either be plugged into a source of electric power for recharging, or can be removed from the snake 20 and plugged into a recharging dock. The battery 24 also preferably provides electric power to other systems operating within the snake 20. For instance, the battery 24 can supply electric power to the voltage source 60 and the current sensor 70 (if the current sensor 70 needs a power source), if the voltage source 16 and current sensor 70 are mounted to the snake 20 or located adjacent thereto. To maintain an electrical connection between the cable spool 26 and the first conductor 28, electrically conductive slip rings can be utilized, or other connectors (e.g. brushes) can be utilized. In one embodiment, the housing also supports a display 72 to show current sensor 70 data, and also optionally a processor, and memory for data analysis. In other embodiments, a transmitter 74 transmits data to a separate device for analysis.

Figure 4:
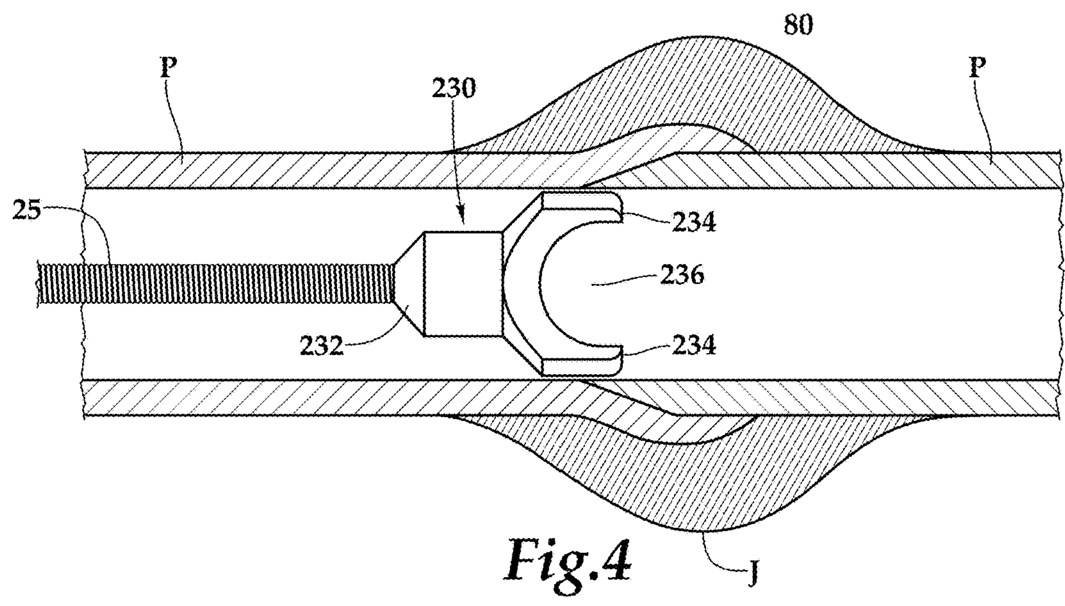
FIG. 4 is a full sectional view of a portion of the service line or other pipe with a probe of the system being fed therethrough, and illustrating how electric characteristics of the pipe are scanned according to this invention.

With particular reference to FIGS. 3 and 4, details of the probe 30 are described, according to this example embodiment. The probe 30 provides a portion of the electrically conductive path within the system 10 of this invention. This electrically conductive path can be thought of as part of a complete circuit which allows current to pass from the voltage source 60 back to the voltage source 60, following the first conductor 28, and the second conductor 48, optionally provided between the spool 40 and the ground stake 50, and also with the circuit including water or other liquid within the pipe P, the wall of the pipe P, and soil 80 between the wall of the pipe P and the ground stake 50.

The probe 30 could have a variety of different configurations. In one embodiment, the probe 30 matches characteristics of the probes disclosed in U.S. Pat. Nos. 9,304,055 and 6,301,954, incorporated herein by reference in their entirety. However, in one embodiment disclosed therein (FIG. 3), rather than having a triple electrode form, a single coiled helical wire is provided as the probe 30. A root 32 defines a first end of the probe 30 and a tip 34 defines a second end of the probe 30 opposite the root 32. The probe 30 is preferably removably attached to the cable 25 through a connector 35. Such a removable connection allows for replacement of the probe 30 with another probe should the first probe 30 become contaminated or damaged, or to accommodate different pipe P sizes (typically 0.5 inch to 3.0 inch in diameter).

Most preferably, the helical wire forming the probe 30 includes alternating loose helical sections 36 and tight helical sections 38. The loose helical sections 36 are somewhat more bendable than the tight helical sections 38, to facilitate tight bends B (FIG. 3) in the probe 30, which allows the probe 30 to be fed along tight bends such as 90° bends within small pipes, such as pipes as small as a half inch in diameter. Furthermore, this geometry helps to ensure intimate contact with walls of the pipe. Such contact can include scraping contact.

In one embodiment, when the system 10 of this invention indicates that lead might be present within walls of the pipe P, material scraped by the probe 30, and especially the loose helical sections 36, can be sampled with a test strip which can then be utilized within a lead testing kit to determine if lead is present on the probe 30. If lead is present, the system of this invention can help to determine which portion of a pathway that the probe 30 passed along is most likely the portion containing lead therein. Alternatively, an entire segment of the pipe can be removed. The probe 30 can then be removed for thorough cleaning and/or a new probe which has not come into contact with lead can be replaced through the connector 35. Alternatively, the probe 30 can be thoroughly cleaned in place until it does not return a positive reading for lead anymore.

Referring to FIGS. 3A and 3B, two alternate tips 230, 330 are shown, which can be substituted for the tip 30. The alternate tip 230 has a connection 232 where the cable 25 transitions into the alternate tip 230. Two similar fingers 234 extend from the connection 232 with a gap 236 therebetween. With such a two finger 234 form, if the tip 230 gets stuck in a pipe P, often rotating the cable 25 (and hence also the tip 230) will cause the tip 230 to climb off of a structure it is stuck upon and be freed. The alternate tip 330 has a connection to the cable 25 that is flat, but otherwise the alternate tip 330 has a spherical form.

The first conductor 28 of the snake 20 leads toward the ground stake 50, typically through a spool 40. The spool 40 is optionally provided to allow for management of the first conductor 28, especially when it has some distance away from the ground stake 50. The spool 40 includes a base 42 with a hub 44 rotatably supported upon the base 42 and with the first connector 28 rotatably supported upon the spool 40 about this hub 44. A second conductor 48 extends from the hub 44 to the ground stake 50. This connection to the second conductor 48 can be in the form of slip rings, brushes or other connection which maintains a secure electrical connection between the first conductor 28 on one side of the spool 40 and the second conductor 48 on the other side of the spool 40. As an alternative to the spool 40, sections of electrically conductive wire, such as similar to an extension cord, can merely be plugged together between the snake 20 and the stake 50.

The stake 50 is preferably an elongate spike with an upper end 52 opposite a point 56. A coupling 54 near the upper end 52 has the second conductor 48 coupled thereto, either permanently or through a removable attachment. The stake 50 is inserted into the ground. Typically a location within the ground G is selected which is relatively close to the underground pipe P to be scanned.

The ground G can have a variety of different conductivities, affecting a resistively of a soil 80 "electric circuit" portion between the pipe P and the ground stake 50. Typically the soil 80 conductivity is less than a conductivity of the pipe P, although if the pipe is formed of plastic, concrete or clay, the conductivity may be similar to that of soil, depending on the characteristics of the soil (moisture content, soil type, etc.). Generally speaking, a voltage of the voltage source 60 generates a current which passes along a path through the soil 80. The longer this path is, the greater the percentage of the voltage drop occurs through the soil 80. As one example, if 99% of the voltage drop occurs in the soil 80, only one percent of the voltage drop is occurring along either the first conductor 28, second conductor 48, cable 25, probe 30, water in the pipe P and wall of the pipe P. Current measurements will be correspondingly low. It can thus be more difficult to determine the difference between current changes associated with small variations in the soil 80 forming a portion of the conductive path and other variations such as those associated with the wall of the pipe P.

By placing the ground stake 50 relatively close to the underground pipe P being scanned, the length of the conductive path through the soil 80 is reduced, so that a relatively lesser amount of the voltage drop within the overall "circuit" occurs through the soil 80. In one typical example, a service line S between a water main W and a house H is being evaluated. A curb stop C along this service line S is at a known location. Furthermore, a meter box M adjacent to or within the house H is in another known location. Generally, the ground stake 50 can be placed at a midpoint between the curb stop C (or other access point) and the meter box M (or other end point). This will generally minimize a "length" of soil 80 along which current driven by the voltage source 60 must pass, and generally increasing readings of the current sensor 70 and enhancing meaningfulness of the acquired data.

The voltage source 60 can be located at any location along this conductive pathway between the probe 30 and the ground stake 50. In one embodiment, the voltage source 60 is located along the first conductor 28. In a second embodiment, the voltage source 60 can be mounted to a housing of the snake 20. In a third embodiment, the voltage source 60 can be associated with the spool 40. In a fourth embodiment, the voltage source 60 can be associated with the ground stake 50. The voltage source 60 could have any of a variety of different voltages. Furthermore, the voltage source could be a DC voltage source or an AC voltage source. Typically a DC voltage source is utilized and the circuit formed by the system 10 of this invention is a DC circuit. However, and especially for longer circuits, at least portions of the circuit could be AC in nature to minimize power required or for other benefits. Transformers and/or inverters can convert from AC to DC and vice versa if the circuit is hybrid in nature.

The current sensor 70 could be adjacent to voltage source 60 or elsewhere on the conductive path. In one embodiment, the current sensor 70 is mounted to the housing of the snake 20. In a second embodiment, the current sensor 70 is along the first conductor 28 between the snake 20 and the stake 50. In the third embodiment, the current sensor 70 is incorporated into the spool 40. In a fourth embodiment, the current sensor is integrated into the ground stake 50. Any of a variety of different types of current sensors 70 can be utilized.

Current sensor 70 can output data to a display 72 and/or can route data to a transmitter 74. The data from the current sensor 70 can be processed, such as with a processor. The first step in such processing typically involves correlating current sensor 70 readings with position along the pipe P. Such correlation with position can occur by keeping track of time and advancing the probe 30 at a fixed rate along the pipe P. However, most preferably the snake 20 is configured to keep track of an amount of cable 25 which has been fed into extension 2 or otherwise into the pipe P being scanned. This distance/position information is gathered and correlated with readings from the current sensor 70 so that a series of data sets are provided with each data set having two elements including a current sensor 70 reading and a distance/position reading.

Figure 5:
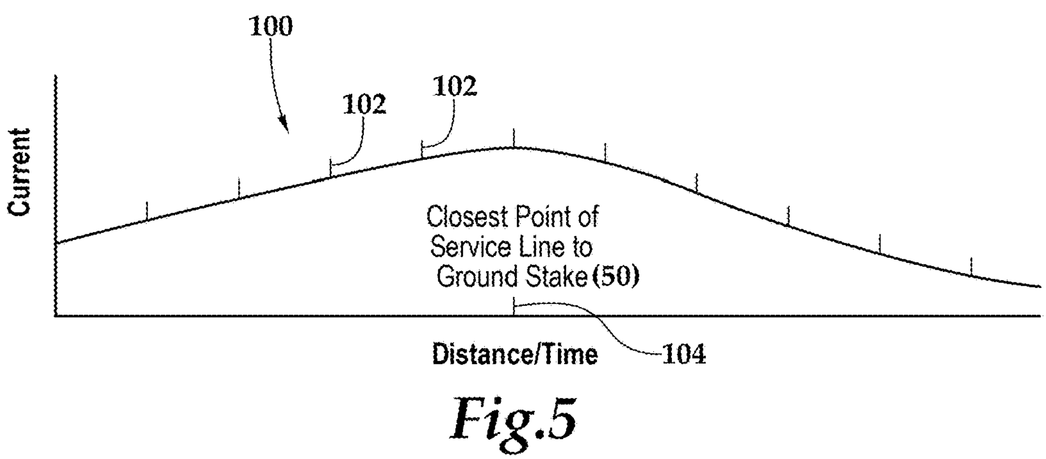
FIG. 5 is a graph generally depicting sensed current versus distance (or time) gathered by the system of this invention, and before any normalization.
Figure 6:
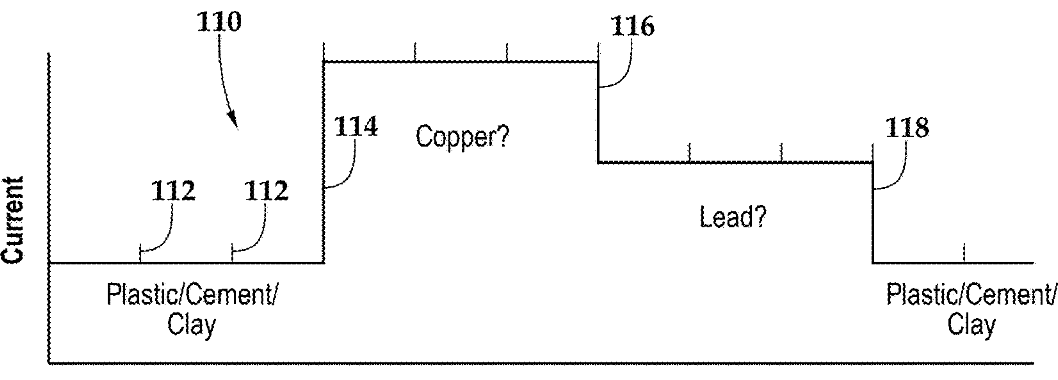
FIG. 6 is a graph which has been normalized to account for distance of portions of the pipe away from a ground stake of the system, and illustrating how different materials from which the pipe is formed return different current values when the probe is passing therethrough.
Figures 7, 8:
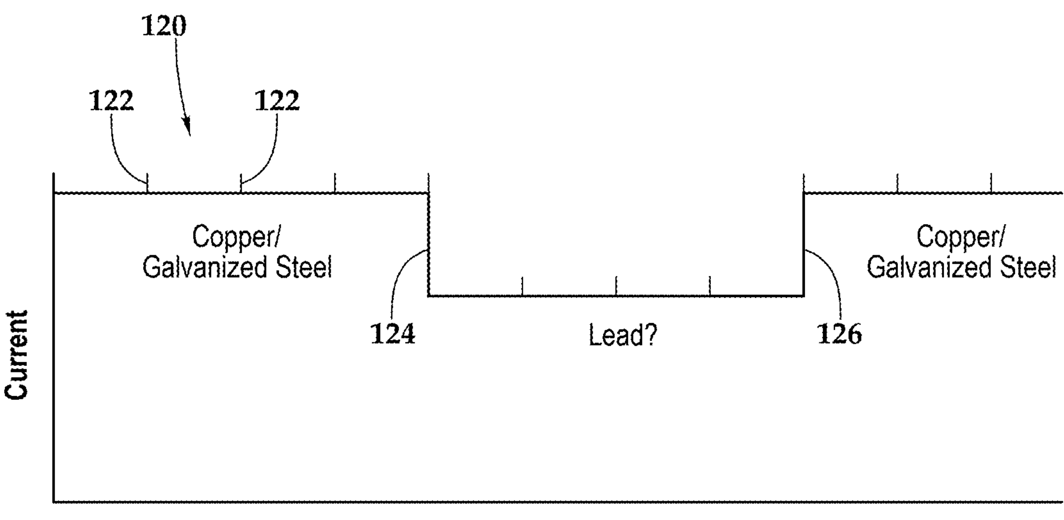
FIG. 7 is a graph similar to that which is shown in FIG. 6, but for a second service line having distinct characteristics relative to a first service line depicted in FIG. 6.
FIG. 8 is a table of representative electrical properties of various different materials.
Figures 9, 10, 11, 12, 13:
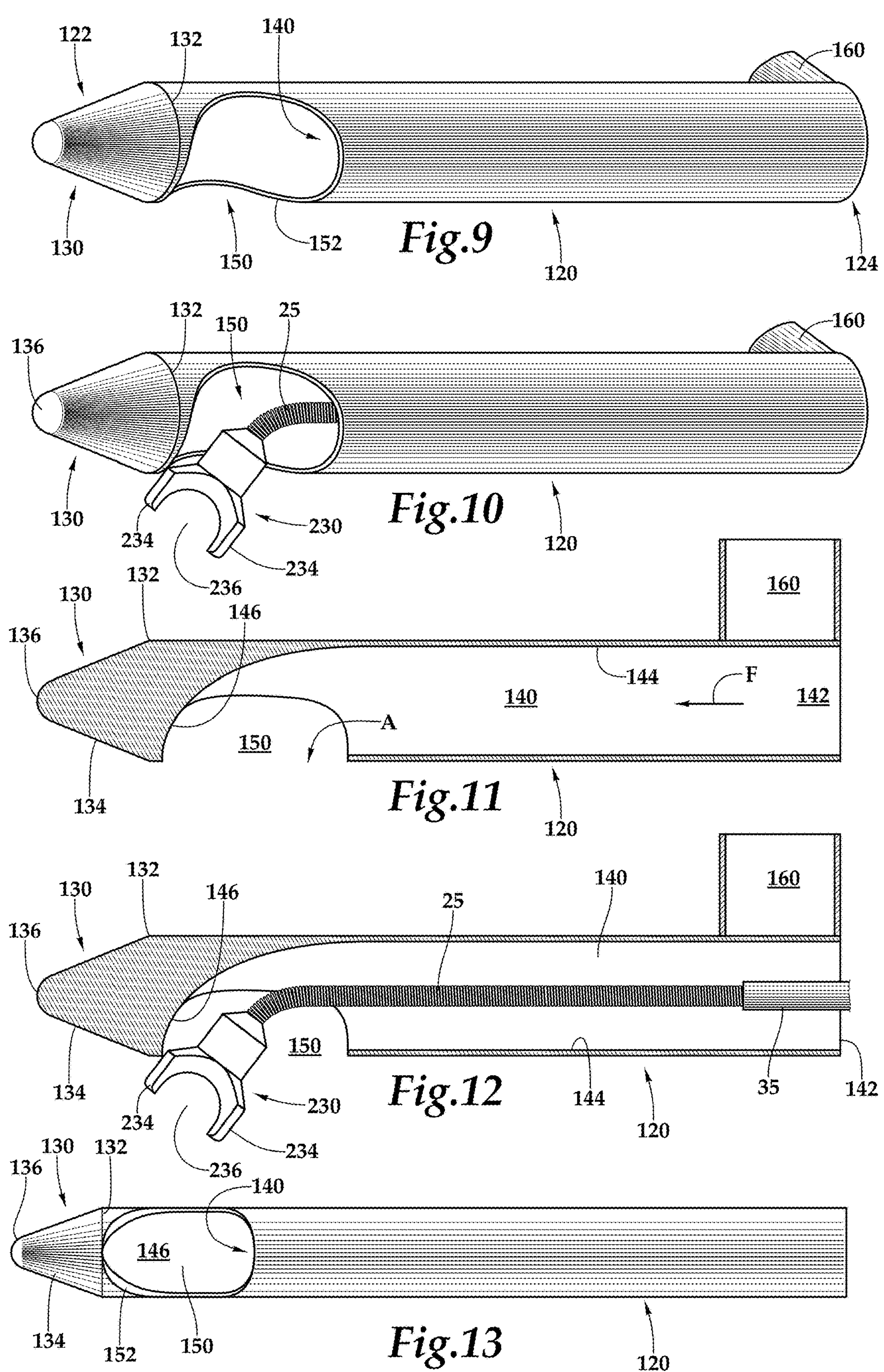
FIG. 9 is a perspective view of an insertion tool according to one embodiment of this invention, the tool configured to facilitate routing a terminal end of a flexible elongate object past a bend in a pipeline.
FIG. 10 is a perspective view similar to that which is shown in FIG. 9, and with a terminal end of a probe passing through the tool, such as for passage through a bend.
FIG. 11 is a full section front elevation view similar to that which is shown in FIG. 9.
FIG. 12 is a full section front elevation view similar to that which is shown in FIG. 11, but with a terminal end of a flexible elongate probe passing through a hollow core of the tool and out of a port in the tool in a curving fashion, such as to access and traverse a bend in a pipeline downstream of the tool.
FIG. 13 is a bottom plan view of that which is shown in FIG. 9.

Output from the system 10 can include this data set with multiple data points taken at different distances along the pipe P so that a two-dimensional graph of the output from the current sensor 70 can be provided (see FIGS. 5-7). If desired, a user U can first measure how deep the pipe P is underground. This distance can then be subtracted from an overall length of pipe being analyzed, or the length of pipe being analyzed can include both vertical riser R portions of the pipe P as well as horizontal service line S portions of the pipe P.

In one embodiment, distance information can be verified by taking into account when the current sensor 70 outputs a maximum current value, which may represent a closest point the service line S passes to the ground stake 50 (104 in FIG. 5). As a further option, the cable 25 can be first played off of the snake 20 all the way to an endpoint, such as adjacent to the meter box M of the service line S, and then the probe 30 can be slowly returned back through the pipe P during a data gathering pass through the pipe P.

Readings can be taken as often as desired. Distance information can also be verified by looking for spikes in the current data which can be representative of joints in the pipe P. Because joints tend to have thicker walls and with the walls typically formed of electrically conductive material, a greater amount of current will be detected when the probe 30 is adjacent to such a joint J (FIG. 4). When these joints J occur at regular intervals corresponding with standardized lengths of pipe P, such regular spikes can further be utilized to calibrate distance along the pipe P.

Once the data has been gathered from the current sensor 70, it can then be transmitted, such as with the transmitter 74, to a separate device for processing or can be processed with an onboard processor (such as supported by the housing of the snake 20). In one embodiment, the transmitter 74 utilizes a Bluetooth protocol and transmits the data to a smart phone or tablet or other wireless or wired computing device.

In addition to adjusting the data to ensure that distance data is accurate within the data set, the data set can also be normalized such as to subtract out non-linearity in the data due to distance of the probe 30 away from the ground stake 50. For instance, when the probe 30 is closest to the ground stake 50 a greatest amount of current will typically be detected by the current sensor 70. However, this increase in readings by the current sensor 70 do not correlate in any way with material from which the pipe is formed. Rather, it merely reports closeness of the pipe P to the ground stake 50.

In one embodiment a calibration test is first conducted which involves placing a pipe P of known material being tested with the system 10 of this invention. With the pipe P formed of only one material, the only impact on current sensor 70 readings will be distance of the pipe P away from the ground stake 50. Spikes 102 in the data may appear at regular intervals within the graph 100 (FIG. 5) depicting where joints are located within the pipe P. A point of highest current sensor 70 data 104 represents a point within the pipe P which is closest to the ground stake 50. This calibration data can then be essentially subtracted from raw current sensor 70 output data to produce normalized graphs such as graph 110 (FIG. 6) and graph 120 (FIG. 7). Such normalized graphs have had subtracted therefrom the affect of distance of portions of the pipe P away from the ground stake 50 and have to some extent an effect similar to if the ground stake 50 were moved along with the probe 30 to maintain a shortest distance between the ground stake 50 and the probe 30.

Graphs 110, 120 (FIGS. 6 and 7) can either be evaluated visually or can merely be analyzed by a processor to determine if the presence of a lead pipe P is indicated. With reference to graph 110 (FIG. 6) short duration spikes in the current sensor 70 data represented by spikes 112 within the graph 110 can be indicative of joints in the pipe P where a greater amount of electrically conductive material such as that associated with a coupling or a soldering joint, or accumulation of a greater amount of electrical conductive liquid within the pipe, is indicative of such a joint J (FIG. 4).

The graph of current sensor 70 data also typically includes abrupt transitions such an abrupt transition 114 where the sensed current abruptly transitions to a higher level and maintains the higher level. An abrupt transition upward is a clue that the pipe P has transitioned from a pipe P segment formed of a lower electrical conductivity material to a pipe P segment formed of higher electrical conductivity material. Similarly, an abrupt transition downward which has been maintained for some time generally indicates a transition from a pipe P segment having a greater conductivity to a pipe P segment having a lesser conductivity.

In one embodiment, lead is indicated when current from the current sensor 70 indicates a pipe P segment having a conductivity which is intermediate in value, neither being as high in conductivity as copper nor as low in conductivity as plastic, cement or clay. In one embodiment, at least one pipe P segment is formed of a known material. If the known material has a conductivity lower than lead, and a transition to a pipe segment with a higher conductivity occurs, the higher conductivity pipe P segment can then be evaluated. Through experience, a magnitude of the transition can be correlated with conductivities of types of different materials. For instance, if the sensed current increases ten times in magnitude following an abrupt transition 114 (FIG. 6) this might be more indicative of a transition from plastic to copper than plastic to lead. However, if the sensed current increases between two times and five times in magnitude following an abrupt transition, such an abrupt increase of intermediate magnitude might be more indicative of a pipe segment formed of lead.

Similarly, when a known pipe P segment is formed of copper, and an abrupt transition 116, 118 (FIG. 6) in a downward direction is sensed, this might be indicative of a lead pipe segment or a plastic pipe segment. Again, a magnitude of reduction in current could be evaluated to inform as to the material from which the pipe P segment beyond the transition is formed. If the magnitude of decreasing current is large (e.g. down to 1/10 or less of a previous reading), this can be indicative of a transition to plastic. However, if a more intermediate decrease in current is detected, this would be more indicative of a lead pipe segment.

In other examples, multiple different pipe segments might be encountered formed of multiple different materials. If pipe segments of three distinct conductivities are detected, pipe segments having an intermediate conductivity value would be indicative of the pipe P segment being formed of lead. While pipe P segments of the highest conductivity would be inferred to be formed of copper and pipe P segments of the lowest conductivity would be inferred as being formed of plastic, cement or clay. In a further example, FIG. 7, a graph 120 is shown which has regular spikes in current 122 indicative of joints in the pipe. Abrupt transitions 124 and 126 indicate transitions between pipe P segments formed of different materials. If two pipe segments of known material have conductivities above and below conductivity of lead (e.g. copper and plastic), any pipe P segment with an intermediate current reading between the current readings for the copper pipe P and the plastic pipe P would indicate presence of a lead pipe P.

According to one method of this invention, every transition which presents the possibility of lead being present can be physically tested for the presence of lead. For instance, the probe 30 can be advanced until just short of a transition into a pipe P segment which might include lead, and then retracted and the probe 30 surfaces wiped with a lead test strip. The probe 30 can then be again advanced and this time past the transition into the section of pipe suspected to be formed of lead. It can then be retracted and surfaces of the probe 30 wiped with a test strip and tested for lead. Such a process can be repeated past multiple different abrupt transitions. Results of the physical testing of the test strips as to whether or not they contain lead can confirm what was suspected. If any lead is detected, remediation can be confidently performed on just the lead pipe segments.

With particular reference to FIG. 8, a table 130 is provided which includes resistivity and conductivity values for various different materials. It can be seen from this table that lead has a relatively unique resistivity and conductivity, with the closest material in resistivity being "tin," at a value of only slightly more than half the resistively of lead. Through extensive use of the system 10 of this invention and study of data output by the system 10, one can gain familiarity with the types of current versus distance graphs which are generated, especially for the particular soil types encountered in different municipalities and locations where the system 10 is implemented. Furthermore, factors such as time of year and amount of rainfall can also be well understood over time and subtracted out of the data so that keen insights as to the nature of the pipe P being scanned can be determined. In some cases, such current data can be conclusively determined to indicate a segment of likely lead pipe. In other instances, a probability that a lead pipe segment has been encountered is returned, sufficient to warrant further testing, either by testing a surface of the probe 30 or making test holes to directly test a segment of pipe P suspected of containing lead.

With particular reference to FIGS. 9-13, details of and insertion tool are described for routing a tip 34 of a probe 30 past a bend in a pipe P, such as downstream from an access port 8 (FIG. 1). A guide rod 120 provides at least a portion of at least one embodiment of such an insertion tool. The probe 30 is one form of elongate flexible object/item, with the tip 34 being one form of terminal end for such an elongated flexible object.

Figures 14, 15, 16:
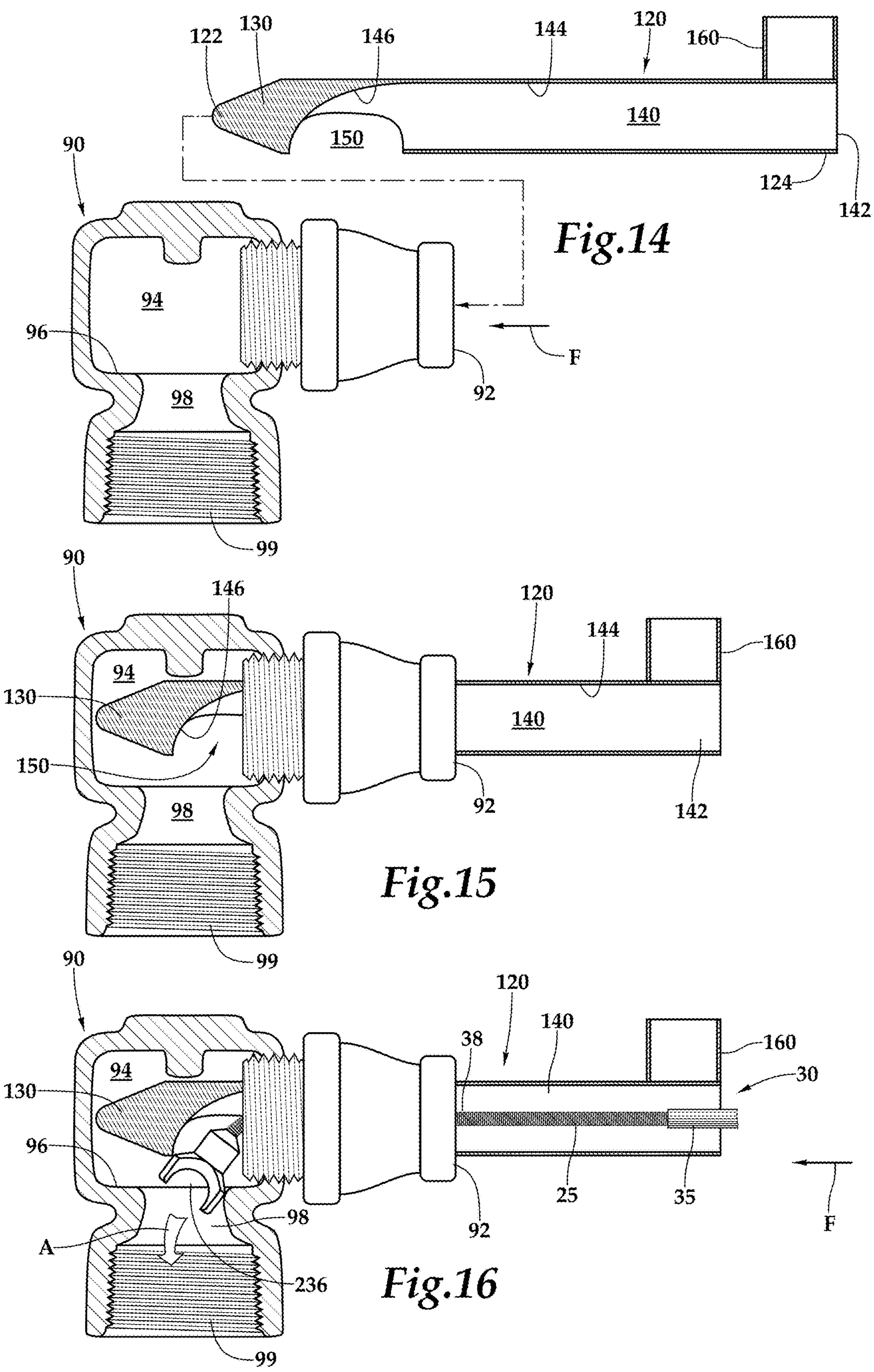
FIG. 14 is a front elevation full sectional view of the tool of FIGS. 9-13 exploded away from a water meter fitting, depicting one form of access into a pipeline, the water meter fitting including a sharp bend therein.
FIG. 15 is a front elevation full sectional view similar to that which is shown in FIG. 14, but after the tool has been inserted into the fitting.
FIG. 16 is a front elevation full sectional view similar to that which is shown in FIG. 15, but after a terminal end of an elongated flexible probe has been passed through the tool and is exiting the port of the tool and being routed through a neck in a bend of the water meter fitting, according to a method of this invention.

One convenient way to access a pipe P is through a water meter fitting 90 (FIGS. 14-16). However, such a water meter fitting 90 typically features a 90° bend, which can be difficult for the tip 34 of the probe 30 to traverse. Furthermore, many water meter fittings 90 include an entrance 92 which leads into a corner chamber 94. An exit opposite the entrance 92 from the corner chamber 94 is defined by a neck 98 leading into a threaded base 99 which interfaces with further portions of the pipe P (or riser R) (FIG. 1). Often the corner chamber 94 includes a shoulder 96 which spaces the neck 98 away from a rear wall of the corner chamber 94 most distant from the entrance 92. When the terminal end of a flexibly elongate object, such as the tip 34 of the probe 30, passes through the entrance 92 and into the corner chamber 94, there is no convenient way to cause the tip 34 to curve into the neck 98 and traverse the bend of the water meter fitting 90.

According to this invention, the guide rod 120 or other insertion tool is placed passing through the entrance 92, and with a distal end 122 of the guide rod 120 abutting the wall of the corner chamber 94 opposite the entrance 92. This leaves an outlet of the insertion tool, such as in the form of a port 140 in the guide rod 120, facing the neck 98 and avoiding interference by the shoulder 96.

In one embodiment, insertion tool is in the form of the guide rod 120 which features a proximal end 124 opposite the distal end 122. A hollow core 140 within the guide rod 120 extends from an entry 142 to the port 150. In one embodiment, the entry 142 is at the proximal end 124 of the guide rod 120, but the entry 142 could in other embodiments be not precisely at the proximal end 124 of the guide rod 120, such as if some form of grip or handle of the guide rod 120 or other extension of the guide rod 120 extends proximally away from the entry 142.

The hollow core 140 also includes sidewalls 144 which define lateral sides of the hollow core 140 surrounding a central axis (also called a centerline) of the hollow core 140. An end of the hollow core 140 opposite the entry 142 is defined by a curve 146. This curve 146 defines one embodiment of a lateral deflection surface. In other embodiments, this lateral deflection surface could be a facet which is planar or almost planar.

The curve 146 in one embodiment has a constant radius of curvature, but most preferably has a decreasing radius of curvature as the curve 146 extends away from the entry 142. In the embodiment shown, this curve 146 has a semi-cylindrical form at each point along the curve 146, with a radius of this cylindrical form decreasing as the curve 146 extends away from the entry 146 and toward the port 150. As an alternative, this curve 146 could be defined as being of a semi-spheroid form and still having a decreasing radius of curvature as the curve 146 extends toward the port 150.

The curve 146 preferably ends with a tangent line thereof perpendicular to a tangent line adjacent to a beginning of the curve 146 closest to the entry 142, so that a tip 34 of the probe 30 rides along the curve 146 and is caused to bend up to about 90° as it follows this surface of the curve 146. As an alternative, this amount of curving of the curve 146 could be greater than 90° or less than 90°, especially with such amount of curving matching (or approximating) an amount of bend within the portion of the pipe P being navigated. For instance, if a 120° bend were involved in the pipe P, a guide rod 120 or other insertion tool could be provided with a lateral deflection surface, such as a curve 146, which also curves about 120°, or at least more than 60°, so that a relatively high probability is provided that the terminal end of the elongate flexible object can traverse the bend.

The distal end 122 of the guide rod 120 is defined by a tip 130 in one embodiment. The guide rod 120 can have a cylindrical form with a constant diameter, until it transitions at the tip 130 into a conical form with a blunt end 136. The tip 130 begins at a transition 132 between the cylindrical main body of the guide rod 120 and into the tip 130. The tip 130 then follows a taper 130 of conical form, and terminates at the blunt end 136 which blunt end 136 is preferably semi-spherical.

The port 150 defines an outlet from the hollow core 150 from which the tip 30 of the probe 34 can exit the guide rod 120. The port 150 is surrounded by a rim 152 which rounds off any sharp edges of the port 148, and assists the guide rod 120 from becoming snagged on structures within the water meter fitting 90 or pipe P generally. The port 150 is preferably spaced from the blunt end 136 of the tip 130 by an offset distance. This offset distance is preferably similar to a shoulder 96 length away from a wall of the corner chamber 94 opposite the entrance 92. In this way, the port 150 is positioned as desired to facilitate navigation of the bend provided within the water meter fitting 90 or other bend near a pipe P access point. In one embodiment, this offset distance between the port 150 and the blunt end 136 is slightly greater than or slightly less than the size of the shoulder 96.

A handle 160 is preferably provided on the guide rod 120 at a location closer to the proximal end 124 then to the distal end 122. The handle 160 in one embodiment is 180° opposed from a side of the guide rod 120 in which the port 150 is located. In this way, the guide rod 120 can have the port 150 oriented where desired by rotating the handle 160 to be opposite the neck 98 and other downstream portions of the pipe P beyond the bend that is to be traversed. In one embodiment, the handle 160 is a short cylindrical structure, extending laterally from the centerline of the guide rod 120 and adjacent to the entry 142.

In use and operation, and following FIGS. 14-16, details of a method for navigating a bend in a pipe P are described, according to this embodiment, utilizing the guide rod 120 or other insertion tool. Initially, the guide rod 120 is placed passing through the entrance 92 leading into the water meter fitting 90 (along arrow D of FIG. 14). Such positioning continues until the tip 130 of the guide rod 120 abuts a wall of the corner chamber 94 of the water meter fitting 90, opposite the entrance 92. The handle 160 is positioned opposite a threaded base 99 or other downstream side of the bend in the pipe P that is to be traversed, so that the port 150 is properly aligned.

The probe 30 or other elongate flexible object is then routed into the entry 142 of the guide rod 120, and continues to be passed along arrow D of FIG. 16 until the tip 34 impacts the curve 146 within the hollow core 140 of the guide rod 120. The tip 34 is then caused to be angled and extended laterally away from the centerline of the core 140 and out of the port 150 and into the neck 98 leading away from the corner chamber 94 (along arrow E of FIG. 16). Further passing of the probe 30 allows the tip 34 to further extend into the pipe P beyond the bend. When the probe 30 has been extended where desired and utilization of the probe 30 according to various uses for the probe 30 is complete, tension forces can be applied to the probe 30, and the probe 30 can be caused to be retracted entirely back out of the pipe P. Typically the guide rod 120 remains in place during this entire process, until the probe 30 and tip 34 or other terminal end thereof have been completely removed from the pipe P and out of the guide rod 120.

While the guide rod 120 is in one embodiment a rigid cylindrical structure formed of a rigid material, such as metal or hard plastic, as an alternative the guide rod 120 could be somewhat flexible itself, such as to bend up to 60° or 90° away from an initial centerline thereof. With such flexibility, the guide rod 120 could be navigated through curving sections of pipe P on a side of a bend in a pipe P closer to an access point, and the tip 130 could still be placed at a sharper bend downstream of such initial curves. In one embodiment, the lateral deflection surface is more rigid than other portions of the guide rod 120, so that the guide rod 120 can flex somewhat to follow curves in a pipe P, but the lateral deflection surface is sufficiently hard to cause the tip 34 of the probe 30 to be laterally displaced when the tip 34 impacts the curve 146 or other lateral deflection surface.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. An insertion tool for navigating pipe bends, the tool comprising:

an elongate rod having a greater length between a proximal end and a distal end than a width perpendicular to a centerline of said rod extending between said proximal end and said distal end;

a hollow core within said rod;

said hollow core extending at least from an entry to a port;

said port located closer to said distal end of said rod than to said proximal end of said rod;

said port located on a sidewall of said hollow core lateral to said centerline; and a lateral deflection surface within said hollow core and adjacent to said port, said lateral deflection surface angled to bend an elongate flexible object passing through said hollow core and towards said distal end in a direction angled laterally away from said centerline and out of said port.

2. The tool of claim 1 wherein said entry is closer to said proximal end than to said distal end.

3. The tool of claim 2 wherein said entry includes said centerline passing therethrough.

4. The tool of claim 3 wherein a handle is located adjacent to said entry and extending laterally away from said centerline.

5. The tool of claim 4 wherein said handle is located on a side of said rod opposite side port.

6. The tool of claim 1 wherein said lateral deflection surface includes a curve.

7. The tool of claim 6 wherein said curve has a decreasing radius of curvature as said curve approaches said port.

8. The tool of claim 6 wherein said curve is semi-cylindrical in shape on at least portions of said curve.

9. The tool of claim 6 wherein said curve is semi-spheroid in shape on at least portions of said curve.

10. The tool of claim 1 wherein said lateral deflection surface includes a facet.

11. The tool of claim 1 wherein said rod terminates at a tip located at said distal end, said port located between said tip and said proximal end.

12. The tool of claim 1 wherein said tip is pointed with a decreasing radius as said tip extends to said distal end of said rod.

13. The tool of claim 12 wherein said tip is semi-conical in shape.

14. A method for inserting an elongate flexible item into a pipeline having bends therein, the method, including the steps of:

placing a tool into an entrance into the pipeline, the tool including an elongate rod having a greater length between a proximal end and a distal end than a width perpendicular to a centerline of the rod extending between the proximal end and the distal end; a hollow core within the rod; the hollow core extending at least from an entry to a port; the port located closer to the distal end of the rod than to the proximal end of the rod; the port located on a sidewall of the hollow core lateral to the centerline; a lateral deflection surface within the hollow core and adjacent to the port, the lateral deflection surface angled to bend an elongate flexible object passing through the hollow core and towards the distal end in a direction angled laterally away from the centerline and out of the port; and routing the elongate flexible item through the tool and impacting the lateral deflection surface of the tool, with resulting passage of a terminal end of the elongate flexible item out of the port of the tool and in a direction lateral to the centerline of the tool.

15. The method of claim 14 wherein said placing step includes locating the distal end of the tool adjacent to a bend in the pipeline, with the tool having the port facing a path leading through the bend.

16. The method of claim 15 wherein said locating step includes rotating the tool until the port is oriented facing the path leading through the bend.

17. The method of claim 14 wherein said placing step includes the lateral deflection surface including a curve.

18. The method of claim 17 wherein said placing step includes the curve having a decreasing radius of curvature as the curve approaches the port.

19. The method of claim 14 wherein said placing step includes the lateral deflection surface having a facet.

20. The method of claim 14 wherein said placing step includes the rod terminating at a tip located at the distal end, the port located between the tip and the proximal end; and the placing step further including moving the rod along the centerline until the tip abuts a wall of a corner chamber adjacent to the bend in the pipeline, with the port spaced from the tip by a distance sufficiently matching a distance between the wall of the corner chamber and the bend, that said routing step results in a terminal end of the elongate flexible item passing through the bend, after being deflected by the lateral deflection surface out of the hollow core of the rod and through the port.

* * * * *